United States Patent [19]

Tateoka

[11] Patent Number: 4,635,243
[45] Date of Patent: Jan. 6, 1987

[54] OPTICAL INFORMATION PROCESSING APPARATUS

[75] Inventor: Masamichi Tateoka, Yokohama, Japan

[73] Assignee: Canon Kabushiki Kaisha, Tokyo, Japan

[21] Appl. No.: 679,934

[22] Filed: Dec. 10, 1984

[30] Foreign Application Priority Data

Dec. 16, 1983 [JP] Japan .................. 58-237277

[51] Int. Cl.[4] .............................. G11B 7/125
[52] U.S. Cl. .......................... 369/44; 369/118
[58] Field of Search ............ 369/44, 45, 46, 109, 369/110, 111, 118, 121, 122; 250/201

[56] References Cited

U.S. PATENT DOCUMENTS 4,243,850  1/1981  Edwards ................. 369/46
4,449,215  5/1984  Reno ..................... 369/111
4,561,082  12/1985  Gerard et al. ........... 369/45

FOREIGN PATENT DOCUMENTS 57-94482  11/1982  Japan ..................... 369/118

Primary Examiner—Donald McElheny, Jr.
Attorney, Agent, or Firm—Fitzpatrick, Cella, Harper & Scinto

[57] ABSTRACT

An optical information processing apparatus is provided with a unit for recording and reproducing information by projecting a main beam onto an information track on a recording medium, a unit for projecting at least two or more than two subsidiary light beams onto the information track to form light spots at different position in the transversal direction of the information track by the respective light beams and a unit for detecting the subsidiary beams reflected by the recording medium to derive a tracking signal for guiding the main beams correctly on the information track, and those light spots are larger in size in the longitudinal direction of the information track than in the transversal direction thereof.

4 Claims, 7 Drawing Figures

OPTICAL INFORMATION PROCESSING APPARATUS

BACKGROUND OF THE INVENTION

1. Field of the Invention

The present invention relates to an optical information processing apparatus capable of writing or reading various information into or from a recording medium by irradiating a light beam to said recording medium.

2. Description of the Prior Art

In the field of optical information processing apparatus there are already known optical disk apparatus, magnetooptical disk apparatus etc. As an example, in case of a magnetooptical disk apparatus, the signal regeneration from the record is conducted in the following manner.

The recording medium is composed of so-called magnetooptical disk consisting of a disk-shaped substrate of glass or plastic and a vertically magnetizable layer of a thickness of several microns provided on said substrate. Said vertically magnetizable layer is composed for example of an amorphous alloy and can be magnetized in a direction perpendicular to the layer surface.

At the information recording on such magnetooptical disk memory, the vertically magnetizable layer thereof is uniformly magnetized in advance in a direction, and is irradiated by a laser beam spot digitally modulated by the information signal to bring said layer to a temperature above Curie point, whereby the magnetization in the irradiated area is inverted under the influence of an external magnetic field to form a record bit representing a logic signal "1" or "0".

At the reading of the information thus recorded on the magnetooptical disk memory, a light beam spot for signal reading irradiates the vertically magnetizable layer, and the signal is read by means of Kerr effect by which the direction of polarization of the reflected beam is affected by the direction of magnetization in the vertically magnetizable layer.

In information recording and regeneration in the above-mentioned optical information processing apparatus, a tracking control is indispensable for constantly following the information track on the recording medium precisely with the light beam. FIG. 1 shows the function of conventional tracking control.

In FIG. 1, a disk-shaped recording medium, hereinafter simply called disk, rotates about a spindle 2. A light beam L from a laser beam source 3 is split, in a diffraction grating 4, into a main beam L2 and subsidiary beams L1, L3. Said beams L1–L3 are guided through a lens 5 and a half mirror 6, then reflected by a tracking mirror 7 and are projected through an objective lens 8 onto the disk 1. FIG. 2 shows the beams L1–L3 on the disk. The information track 15 on the disk 1 is composed of an array of record bits 16 which are the smallest details in the optical structure. The main beam L2 forms a spot S2 on the information track, while the subsidiary beams L1, L3 form S1, S3 on different positions in the transversal direction of the information track.

The beams L1–L3 projected onto and reflected by the disk 1 are again guided through the objective lens 8, then reflected by the mirrors 7, 6 and respectively supplied to photosensors 9, 10, 11 for conversion into electrical signals. The signal from the photosensor 10 is supplied to a reproducing circuit 12 to provide a demodulated signal at a terminal 13. Also the output signals of the photosensors 9, 11 are processed in a servo circuit 14 to provide a tracking signal, according to which the tracking mirror 7 is rotated to deflect the beams L1–L3 in the transversal direction of the information track 15, thus constantly guiding the main beam L2 exactly onto the information track.

However the conventional optical information processing apparatus is associated with a drawback of unstable tracking because of erroneous operation frequently caused by small scars or dust on the disk, as the spot formed by the subsidiary beam is substantially circular and is of a size corresponding to the record bit.

SUMMARY OF THE INVENTION

The object of the present invention is to provide an optical information processing apparatus capable of constantly stable tracking control regardless of the presence of scars or dust on the recording medium.

The above-mentioned object can be achieved according to present invention by forming the spots, generated on the recording medium by the subsidiary beams for obtaining the tracking signal, longer in the longitudinal direction than in the transversal direction of the information track.

DETAILED DESCRIPTION OF THE PREFERRED EMBODIMENTS

Figure 1:
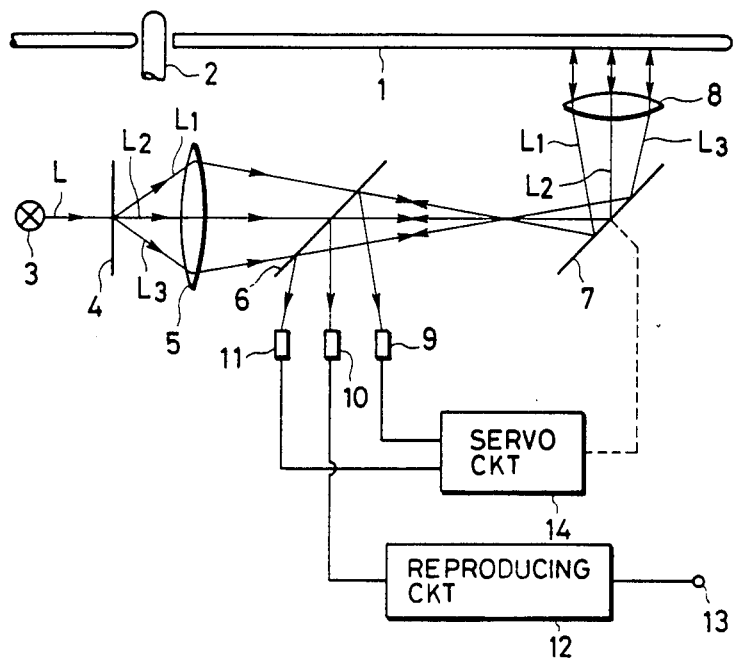
FIG. 1 is a schematic view showing the structure of a conventional optical information processing apparatus.
Figure 2:
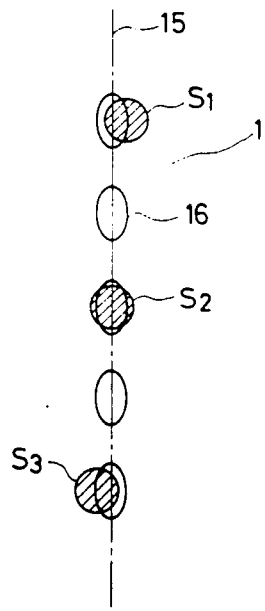
FIG. 2 is a plan view showing spots formed on the disk in the apparatus shown in FIG. 1.
Figure 3:
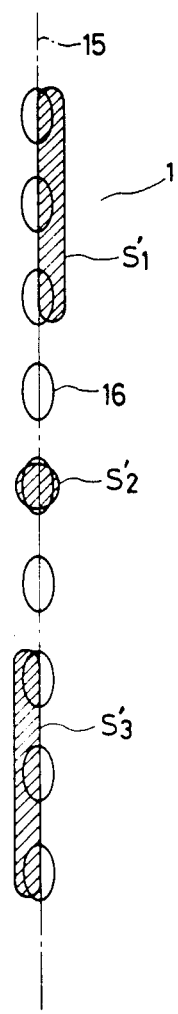
FIG. 3 is a plan view showing spots formed on the disk when the present invention is applied to the information reproduction.

FIG. 3 shows spots formed on the disk in the optical information processing apparatus of the present invention. As in the case of FIG. 2, the information track 15 is composed of an array of record bits 16. On the disk there are formed a reading spot S2' by the main beam and tracking spots S1', S3' by the subsidiary beams. Said spots S1', S3' are formed oval longer in the longitudinal direction than in the transversal direction of the information track and cover several record bits. In general the dimension of the spot S1' or S3' in the longitudinal direction of the information track is three to six times larger than that in the transversal direction. The reading spot S2'; is of a direction corresponding to the record bit and is used for reading the recorded information. The tracking spots S1', S3' are formed in different positions in the transversal direction of the information track 15, and the resulting reflected lights are respectively detected by photosensors to provide a tracking signal in a manner similar to the example shown in FIG. 1.

According to the present invention, the tracking spots formed by the subsidiary beams as shown in FIG. 3 provide unperturbed tracking signal and enable stable tracking control, since the reflected light from the tracking spot is little affected by a partial lack in the information track or by the presence of scars of dust on the disk. Also the light intensity of subsidiary beams should preferably be larger for obtaining a stronger tracking signal, but an excessively strong beams, if projected onto the disk, may generate erroneous records at the information recording or reproduction. However the spot shape of the present invention allows an increase in the amount of light per spot and a stronger tracking signal, without increasing the light intensity per unit area.

Figure 4:
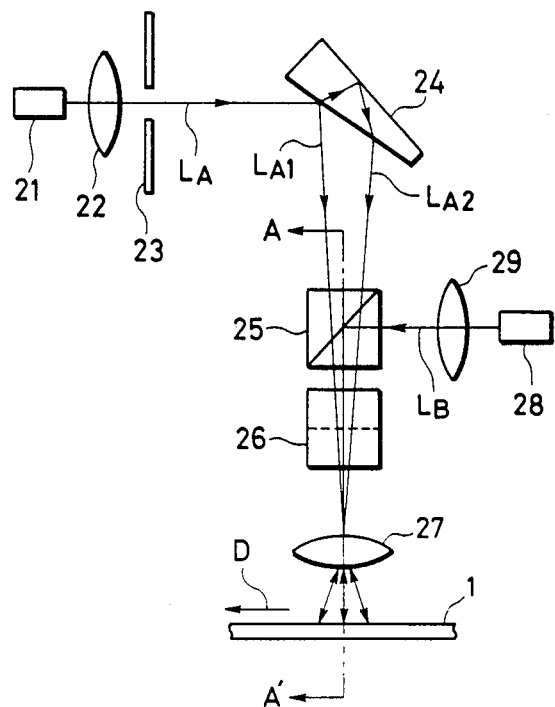
FIG. 4 is a schematic view showing the structure of an optical information processing apparatus embodying the present invention.
Figure 5:
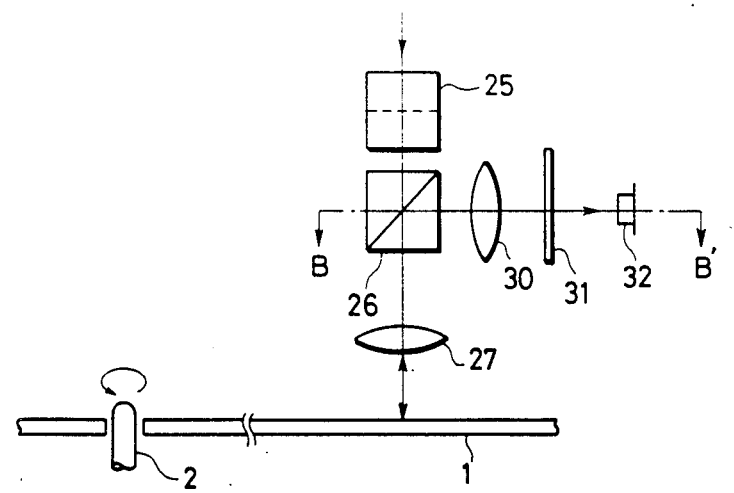
FIG. 5 is a view of the apparatus shown in FIG. 4, seen from a direction indicated by arrows A—A'.
Figure 6:
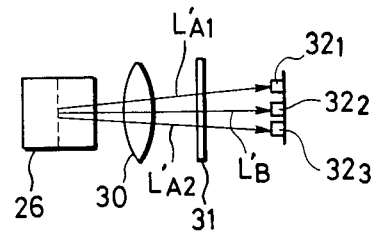
FIG. 6 is a view of the apparatus shown in FIG. 5, seen from a direction indicated by arrows B—B'.

FIGS. 4, 5 and 6 show embodiments of the optical information processing apparatus for obtaining the tracking spots as explained before, applied for example to a magnetooptical disk apparatus.

In FIG. 4, the disk 1 moves in a direction of an arrow D, and the information track extends in the same direction. A light beam LA of a wavelength $\lambda 1$ emitted by a semiconductor laser 21 is converted into a parallel beam by a collimating lens 22, then guided through a diaphragm 23, and divided into two subsidiary beams LA1, LA2, mutually separated by a small angle, in a translucent wedge member 24 composed for example of glass, said beams then entering a wavelength selecting beam splitter 25. On the other hand a main beam LB of a wavelength $\lambda 2$ emitted by a semiconductor laser 28 is also converted into a parallel beam by a collimating lens 29 and enters said beams splitter 25, which is so constructed as to transmit the light of the wavelength $\lambda 1$ and to reflect the light of the wavelength $\lambda 2$. Consequently the main beam LB and the subsidiary beams LA1, LA2 are synthesized in said beam splitter 25 and enter a polarizing beam splitter 26.

The beams LB, LA1, LA2 are P-polarized with respect to said polarizing beam splitter 26 and are transmitted by said splitter 26 and an objective lens 27 to form three beam spots on the disk 1. The main beam LB forms a reading spot S2' shown in FIG. 3. On the other hand, the subsidiary beams LA1, LA2 form, because of being diaphragmed in the longitudinal direction by the diaphragm 23, oval tracking spots as shown by S1', S3' shown in FIG. 3 on the disk 1 through the diffraction effect.

FIG. 5 shows the apparatus shown in FIG. 4, seen from a direction indicated by arrows A—A'. The beams LB, LA1, LA2 reflected by the disk 1 rotating about the spindle 2 and subjected to a rotation of the direction of polarization by Kerr effect, are guided again through the objective lens 27 and enter the polarizing beam splitter 26. The S-components of said beams are selectively reflected by said polarizing beam splitter 26 and are directed to a photosensor 32 through an imaging lens 30 and a polarizing filter 31.

FIG. 6 shows the apparatus shown in FIG. 5, seen from a direction indicated by arrows B—B'. The photosensor 32 is composed of three photodetectors $32_1$, $32_2$, $32_3$ on which images of the spots S1', S2', S3' are formed respectively by the reflected main beam LB', and reflected subsidiary beams LA1', LA2' through said imaging lens. The photodetectors $32_1$–$32_3$ have areas sufficiently larger than the spots formed thereon, and convert said beams into electrical signals. As explained in relation to FIG. 1, the information recorded on the disk is reproduced from the signal of the photodetector $32_2$, while the signals from the photodetectors $32_1$, $32_3$ are differentially processed to provide a tracking signal, according to which the tracking control is achieved in a known manner, for example by displacing the objective lens in the trasversal direction of the information track.

The above-described structure allows formation of three spots on the disk in a manner shown in FIG. 3 and achieves stable tracking control which is the object of the present invention. Also in the present embodiment, since the main beam and the subsidiary beams are obtained from separate light sources, the load of a single light source is alleviated in comparison with the apparatus shown in FIG. 1 in which a beam from a single light source is divided into three beams by a diffracting grating, so that the service of the light source, such as a semiconductor laser, can be extended.

Figure 7:
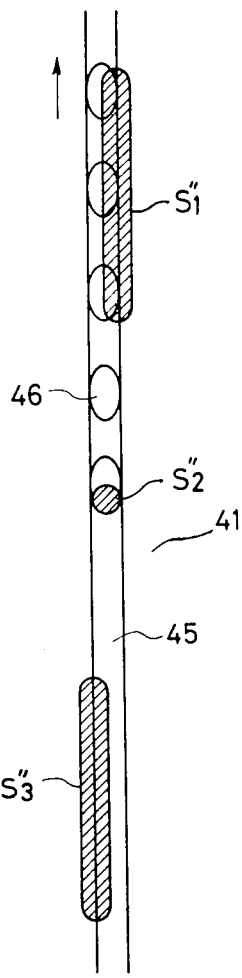
FIG. 7 is a view of spots formed on the disk when the present invention is applied to the information recording.

The foregoing explanation is limited to the case of information reproduction, but the present invention is applicable also to the information recording. In such case, the disk 41 is provided in advance, as shown in FIG. 7, with information tracks for example by grooving (so-called pregrooving). The subsidiary beams irradiate different positions in the transversal direction of the information track to form tracking spots S1'', S3'' and a tracking signal is detected in the same manner as in the signal reproduction from the reflected lights from said spots, including the positional information by diffraction by said groove, to cause the writing spot S2'' of the main beam to exactly folow the information track 45. Said writing spot S2'' forms record bits 46 on the information track, thus recording the information. Again in this case the present invention ensures stable tracking control without the influence by the scars or dusts on the disk, allowing the information to be recorded at a high density without the troubles of overlapped recording resulting from fluctuation in the recording position.

The present invention is not limited to the foregoing embodiments but is subject to various applications. For example, the recording material is not limited to the magnetooptical materials but includes any material capable of optical information recording and/or reproduction, for example metals such as Te, Bi etc., compounds thereof and polymers containing suitable dyes. Also it is applicable to the information reproduction from recording media containing information in the form of surface irregularities, such as so-called video disk or digital audio disk. Also the form of the recording medium is not limited to disk but also includes tape, drum or card.

The structure of the apparatus can be suitably modified according to the recording medium employed. For example, if the magnetooptical material is not used, the polarizer 31 shown in FIG. 5 is unnecessary, and a $\lambda/4$-plate may be inserted between the polarizing beam splitter 36 and the disk 1. Furthermore, such polarizing beam splitter and $\lambda/4$-plate may be simply replaced by a half mirror. In addition to such modification according to the recording medium, it is also possible to replace the diaphragm for modifying the spot form with a beam forming means such as an anamorphic optical system.

What I claim is:

1. An optical information processing apparatus comprising:

means for recording or reproducing information by projecting a main light beam onto an information track on a recording medium;

means for projecting at least two or more than two subsidiary light beams onto said information track to form light spots which are larger in size in the longitudinal direction of said information track than in the transversal direction thereof, at different positions in the transversal direction of said information track by said respective light beams; and means for detecting said subsidiary beams reflected by the recording medium to derive a tracking signal for guiding said main beam correctly on the information track.

2. An optical information processing apparatus according to claim 1, wherein said means for forming the spots of said subsidiary beams comprises a light source, a diaphragm for diaphragming the light beam from said light source with respect to the longitudinal direction of the information track, means for splitting the light beam from said light source into two or more than two light beams, and means for focusing said split beams into spots on the recording medium.

3. An optical information processing apparauts according to claim 1, wherein said main beam and subsidiary beams are respectively generated by different light sources as beams of different wavelengths, and are guided onto the recording medium through a same optical path by means of a wavelength selecting beam splitter. the 4. An optical information processing apparauts according to claim 1, wherein the size of spots, formed by said subsidiary beams, in the longitudinal direction of the information track corresponds to several record bits of said information track.

* * * * *

UNITED STATES PATENT AND TRADEMARK OFFICE
CERTIFICATE OF CORRECTION

PATENT NO. : 4,635,243

DATED : January 6, 1987

INVENTOR(S) : MASAMICHI TATEOKA

It is certified that error appears in the above-identified patent and that said Letters Patent is hereby corrected as shown below:

Column 4, line 36, change "dusts" to --dust--.

Column 6, line 10, change "a" to --the--;

line 12, delete "the".

Signed and Sealed this

Seventeenth Day of March, 1987

*Attest:*

DONALD J. QUIGG

*Attesting Officer*  *Commissioner of Patents and Trademarks*